US006865473B2

(12) United States Patent
Moessinger et al.

(10) Patent No.: US 6,865,473 B2

(45) Date of Patent: Mar. 8, 2005

(54) METHOD AND DEVICE FOR CONTROLLING AN INTERNAL COMBUSTION ENGINE

(75) Inventors: Juergen Moessinger, Weinsberg-Wimment (DE); Andreas Raff, Leonberg (DE); Juergen Gross, Stuttgart (DE); Michael Gerlach, Waiblingen-Neustadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/362,718

(22) PCT Filed: Jul. 28, 2001

(86) PCT No.: PCT/DE01/02867

§ 371 (c)(1),
(2), (4) Date: Jul. 24, 2003

(87) PCT Pub. No.: WO02/16746

PCT Pub. Date: Feb. 28, 2002

(65) Prior Publication Data

US 2004/0030488 A1 Feb. 12, 2004

(30) Foreign Application Priority Data

Aug. 23, 2000 (DE) .......................................... 100 41 448

(51) Int. Cl.[7] ............................ G06G 7/70; G06F 19/00

(52) U.S. Cl. ....................... 701/114; 701/102; 701/103; 701/104; 701/105; 701/115; 123/179.1; 123/179.17; 123/501

(58) Field of Search ................................ 701/102–105, 701/114, 115; 123/179.17, 179.1, 501, 179 L

(56) References Cited

U.S. PATENT DOCUMENTS

| | | | | |
|---|---|---|---|---|
| 4,867,115 A | * | 9/1989 | Henein | 123/179.17 |
| 5,479,910 A | | 1/1996 | Bauer et al. | 123/179.17 |
| 6,513,488 B2 | * | 2/2003 | Enoki et al. | 123/305 |

FOREIGN PATENT DOCUMENTS

| | | |
|---|---|---|
| EP | 05 04 585 | 9/1992 |
| EP | 41 17 393 | 12/1992 |
| EP | 195 39 071 | 9/1996 |
| EP | 196 22 399 | 7/1997 |
| EP | 198 21 561 | 11/1999 |

* cited by examiner

*Primary Examiner*—Willis R. Wolfe
*Assistant Examiner*—Johnny H. Hoang
(74) *Attorney, Agent, or Firm*—Kenyon & Kenyon

(57) ABSTRACT

A method and a device for controlling an internal combustion engine having a central control unit and a peripheral control unit are described. The central control unit transmits request signals to the peripheral control unit. At least two load circuits receive control signals from the peripheral control unit. The peripheral control unit checks the request signals and/or additional signals for plausibility.

8 Claims, 4 Drawing Sheets

METHOD AND DEVICE FOR CONTROLLING AN INTERNAL COMBUSTION ENGINE

FIELD OF THE INVENTION

The present invention is directed to a method and a device for controlling an internal combustion engine.

BACKGROUND INFORMATION

German Published Patent Application No. 198 21 561 describes a method of a device for monitoring electromagnetic load circuits. In this case, the voltage and/or the current flowing through a booster capacitor or present at the booster capacitor are monitored for plausibility.

Furthermore, a method and a device for controlling at least one load circuit are described in German Published Patent Application No. 195 39 071. In that case, the load circuits are divided into at least two groups, the costly and complex components in each case only being provided for one group.

SUMMARY OF THE INVENTION

A central control unit and a peripheral control unit are provided for the control, the central control unit transmitting request signals to the peripheral control unit. Based on these request signals, the peripheral control unit transmits control signals to load circuits. These load circuits may be, in particular, injectors controlling the metering of fuel into the internal combustion engine.

It is especially advantageous in this context that the peripheral control unit checks the request signals and/or further signals for plausibility, thereby substantially increasing the control reliability. It is also advantageous that the central control unit only supplies simply formed request signals, which merely define the beginning and end of the injection. The peripheral control unit then converts these signals into certain current and voltage profiles required for controlling the injectors. Moreover, the peripheral control unit may implement a monitoring of the injectors and output stages. Furthermore, an individual adaptation to the injectors is possible when using a peripheral control unit. On the other hand, the central control unit may be used in a global manner for different injectors. This results in considerable cost savings since the central control unit may be manufactured in large quantities due to the fact that the adaptation to the various injectors occurs in the peripheral control unit.

DETAILED DESCRIPTION

The present invention may be used in internal combustion engines, and particularly in internal combustion engines having self-ignition. The metering of fuel there is controlled by injectors, which are actuated with the aid of electromagnetic valves or by piezo-actuators. In the following, these injectors, valves, and actuators, are referred to collectively as load circuits.

Figure 1:
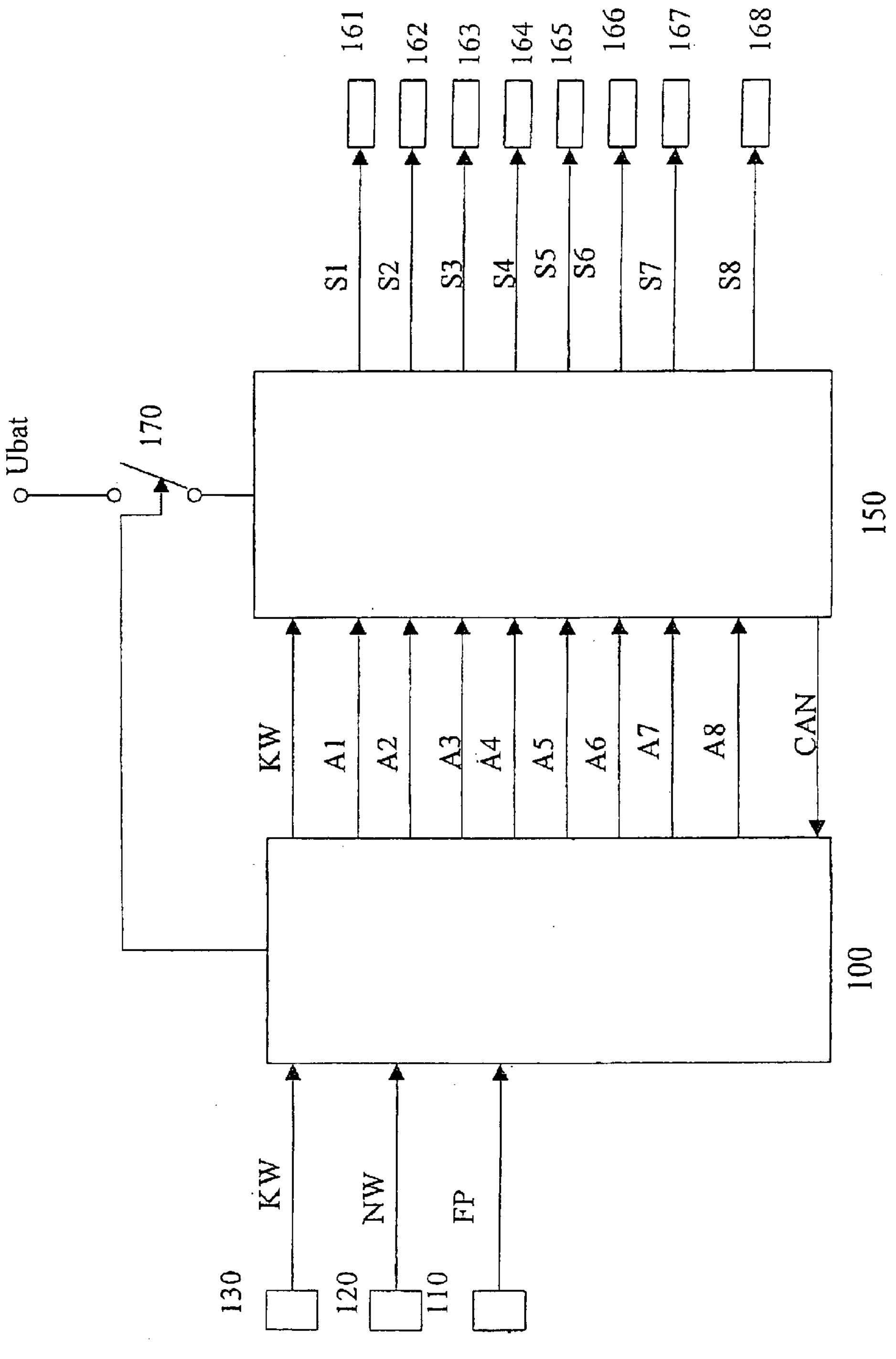
FIG. 1 is a block diagram of the device according to an embodiment of the present invention.

FIG. 1 shows elements of the device according to an embodiment of the present invention. A central control unit is denoted by reference numeral 100. It receives signals from various sensors. These are, first of all, a first sensor 110, which provides a signal FP regarding the driver input; a second sensor 120, providing signal NW regarding the camshaft rotation; and a third sensor 130, which supplies a signal KW regarding the crankshaft position. Sensors 120 and/or sample incremental gears or segmental wheels. These sensors provide pulses having fixed angular spacing.

The central control unit transmits various request signals A1 through A8 to a peripheral control unit 150. The number of request signals may correspond to the number of load circuits to be controlled. Furthermore, central control unit 100 transmits signal KW regarding the crankshaft position to peripheral control unit 150. In each case, request signals A1 through A8 may be transmitted via a line. Moreover, central control unit 100, peripheral control unit 150 and additional units (not shown) are connected via a communication system which, in particular, is implemented as a CAN bus. Peripheral control unit 150 in turn is connected via lines to load circuits 161 through 168, which are each acted upon with control signals S1 through S8. The specific embodiment shown relates to an internal combustion engine having eight cylinders. However, the procedure according to the present invention may also be used in internal combustion engines having a different number of cylinders.

Peripheral control unit 150 is connected to a supply voltage Ubat via a switching means 170, which is able to be controlled by central control unit 100.

On the basis of the different variables characterizing the operating state, the ambient conditions and/or the driver input, central control unit: 100 defines request signals A1 through A8. These request signals determine the beginning, the end and, thus, the duration of the metering of fuel. In appropriately designed load circuits, this signal may be used for the direct control of a switching means for supplying current to a load circuit, especially a solenoid valve. A problem arises when load circuits are used which require a particular current characteristic and/or a particular voltage characteristic for precise control.

Often, fast-switching solenoid valves are used to which an increased voltage, also known as booster voltage, is supplied at the beginning. In the further course, the current is limited to a holding current. This current characteristic may be realized by special output-stage components or output-stage circuits. If these output-stage elements are integrated in the central control unit, a different central control unit has to be manufactured for each injector type. However, if the output stage is in a structurally separate location from the injectors, faults may occur in the data transmission between the central control unit and the output stage.

For this reason, the present invention provides a peripheral control unit 150 which converts the general request signals into special control signals and simultaneously implements a diagnosis, especially of the request signals. The diagnosis result is signaled back to central control unit 100 via the CAN bus, for example. It is particularly advantageous that the central control unit, once a fault has been detected, is able to shut down the peripheral control unit and, thus, the load circuits, by activating switching means 170.

In addition to monitoring request signals A1 through A8, a diagnosis of the injectors and/or the appropriate wirings of the output-stage components can be performed as well.

It is particularly advantageous that the peripheral control unit brings about a phase shift of 90°. This means that the control signals for a particular cylinder are only triggered upon completion of the plausibility check, that is, when the request signal is available in its entirety. In this way, it is possible to cut off the control of the corresponding load circuit and/or of all load circuits in the event of a fault.

Figure 2:
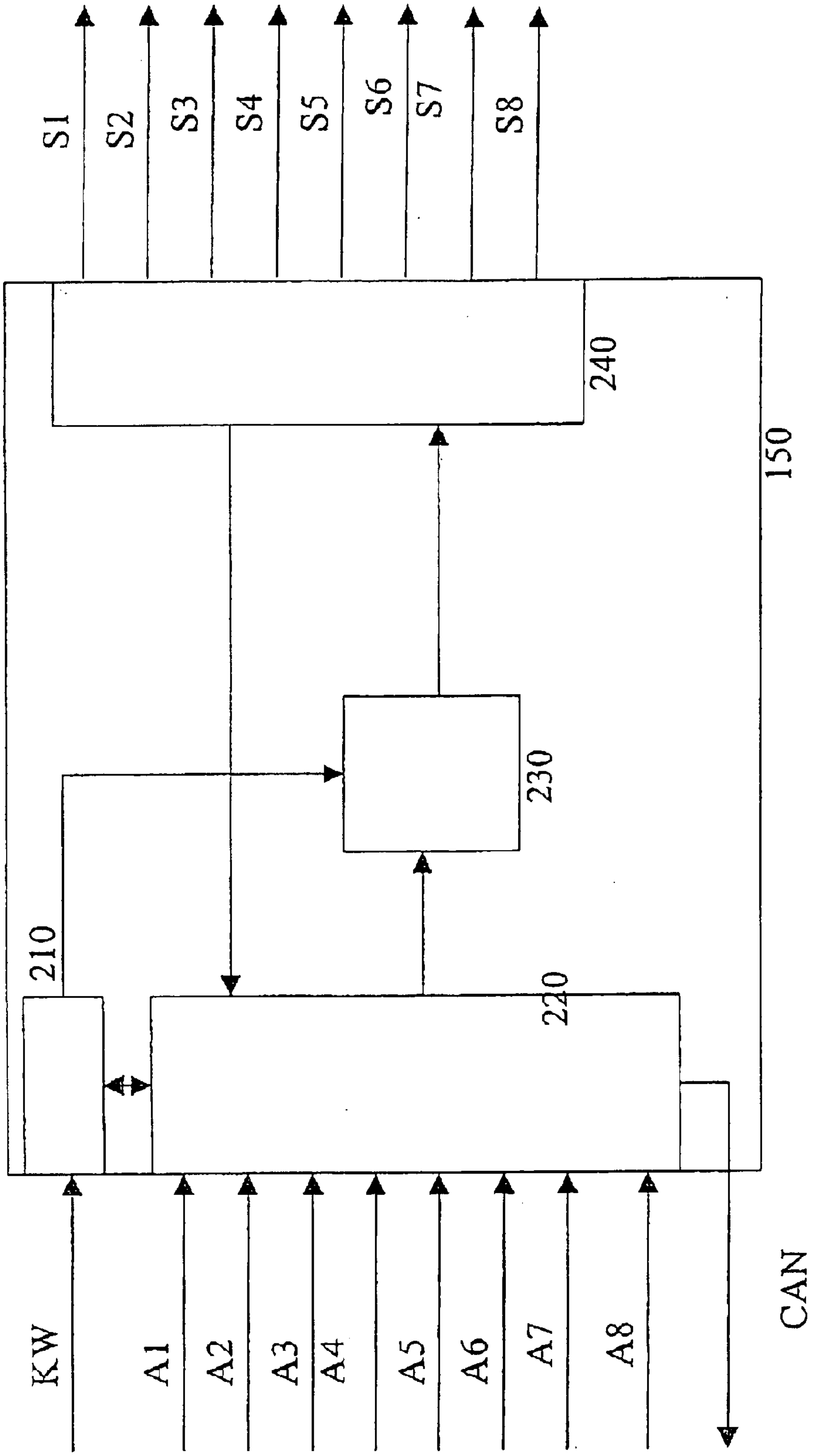
FIG. 2 is block diagram of a peripheral control unit according to an embodiment of the present invention.

A detailed representation of the peripheral control unit is shown in FIG. 2. Elements already described in FIG. 1 are marked with corresponding reference numerals in FIG. 2. Peripheral control unit 150 includes a first monitoring system 210 to which signal KW is transmitted; a second monitoring system 220 to which request signals A1 through A8 are transmitted; a control calculator 230; and an output stage 240 which provides control signals S1 through S8 In one embodiment the output stage may be situated in a location that is structurally separate from peripheral control unit 150.

Control calculator 230 receives signals from the first monitoring system and the second monitoring system and transmits a signal to output stage 240. Output stage 240 sends a signal to second monitoring system 220. Furthermore, the first and the second monitoring system exchange signals. Second monitoring system 220 acts upon the CAN bus with a signal.

Figure 3:
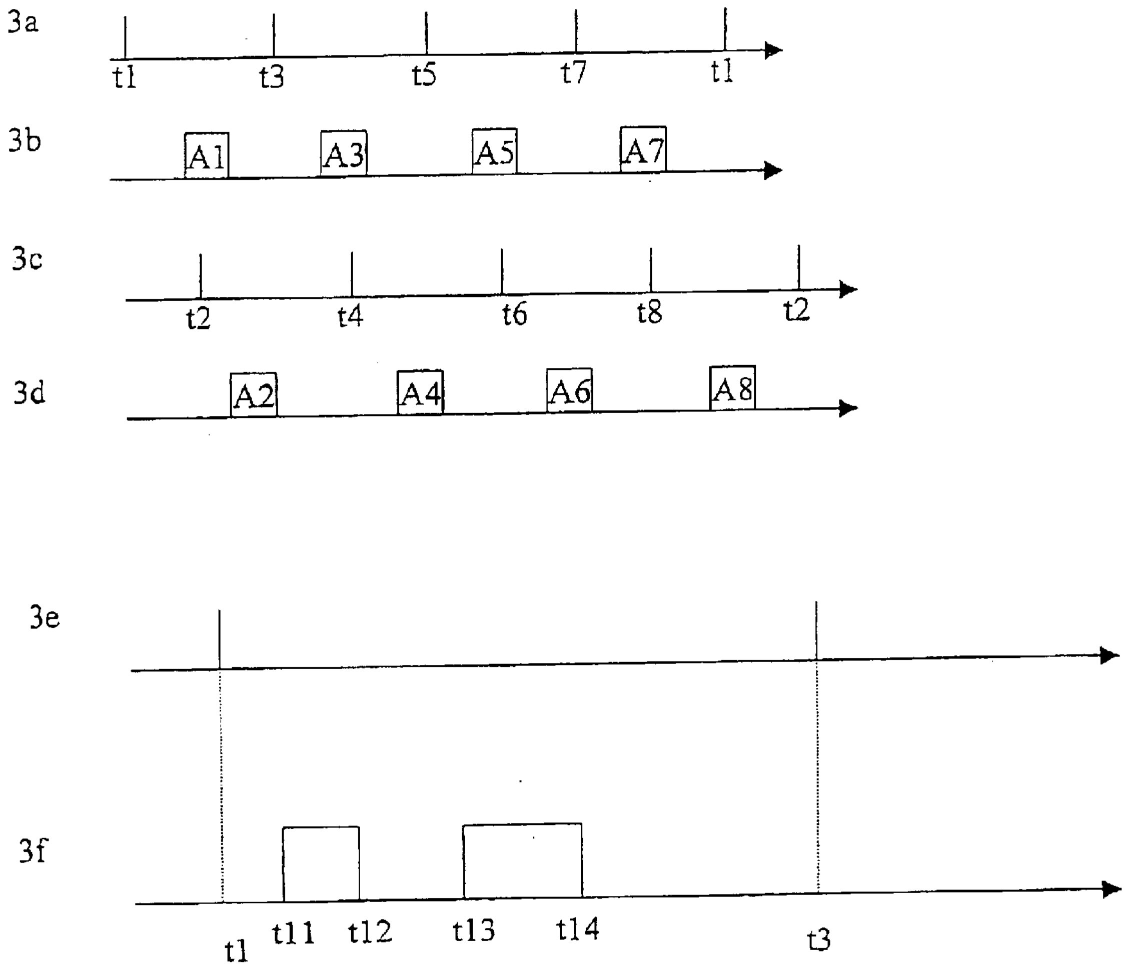
FIG. 3 are plots of signal versus time.

In FIG. 3, different signals are plotted over time. In plot 3*a*, different angular ranges of the crankshaft have been marked for a first group of load circuits, and in plot 3*b* permissible request signals are shown by way of example. In plot 3*c*, different angular ranges of the crankshaft have been marked for a second group of load circuits; and in plot 3*d* permissible request signals are shown, by way of example. Plot 3*e* shows a partial area of plot 3*a* and plot 3*d* shows a partial area of plot 3*b* in an enlarged view.

In plot 3*a*, angular ranges for a first group of load circuits have been marked by perpendicular lines. The corresponding request signals are shown in plot 3*b*. The angular range between point t1 and point t3 marks the angular range in which a request signal A1 is permitted for a first load circuit. The angular range between point t3 and point t5 marks the angular range in which a request signal A3 is permitted for a second load circuit. The angular range between point t5 and point t7 marks the angular range in which a request signal A5 is allowed for a third load circuit. The angular range between point t7 and point t1 marks the angular range in which a request signal A7 is allowed for a fourth load circuit. In the example shown, the interval between two respective points defines an angular range of 180° crankshaft angle. In this context, the conditions in an internal combustion engine having eight cylinders are represented. In an internal combustion engines having fewer cylinders, the angular ranges may be selected to be correspondingly larger.

Accordingly, the angular ranges and the request signals of a second group of load circuits are shown in plot 3*c* and plot 3*d*. In each case, load circuits that follow one another in the ignition sequence have been assigned to different groups of load circuits.

In FIG. 3, a particular embodiment for an internal combustion engine having eight cylinders is shown. In this case, the load circuits have been divided into two groups, the angular ranges of two cylinders belonging to the same group immediately adjoining each other. Angular ranges of two cylinders belonging to different groups may overlap one another. It is also possible to select the angular ranges such that a gap remains between the angular ranges of two cylinders belonging to the same group. This means that there exists an angular range in which request signals are not allowed. The angular ranges may be arbitrarily predefined, depending on the requirements.

An angular range is specified for every request signal. If the request signals impinges upon this angular range, it is recognized as plausible. In this context, the angular ranges of the individual request signals may overlap, may be spaced apart, or may touch.

In plots 3*a* through 3*d*, the conditions of an internal combustion engine having eight cylinders are shown. In an internal combustion engine having fewer cylinders, the angular ranges are correspondingly smaller.

Plots 3*a* through 3*d* show a simple embodiment having only one partial injection. In additional embodiments, particularly in internal combustion engines equipped with an exhaust gas aftertreatment system, additional partial injections may be provided. This is illustrated in plots FIGS. 3*e* and 3*f*, which show an enlarged representation of the angular range between t1 and t3 and the corresponding request signals. In this case, the injection is divided into a pre-injection between points t11 and t12 and a main injection between points t13 and t14.

First monitoring system 210 implements a plausibility check of request signals A1 through A8 using crankshaft signal KW. A fault is detected when the request signal lies outside of the specific angular ranges of the crankshaft. In this case, as shown in FIG. 3, the allowed angular range for the first request signal is defined by instants t1 and t3, for instance. According to the present invention, it is checked whether the request signal begins and/or ends in a specific angular range.

In an alternative exemplary embodiment, it is also possible to process a camshaft signal instead of the crankshaft signal.

If the specific request signal lies inside this angular range, the request signal is detected as plausible. Given a particular number of cylinders, these angular ranges may overlap. This is the case, for instance, in an internal combustion engine having eight cylinders, as shown in FIG. 3.

Moreover, a proper request signal is only detected if the duration of the fuel injection has a particular length, i.e. when the interval between instants t13 and t14 is greater than a first threshold value, or if it is smaller than a second threshold value. If the signal is shorter than the threshold value, the request signal is too short, or an interference pulse has to be assumed. If the request signal is too long, a continuous injection has to be assumed. Corresponding faults are detected by second monitoring system 220.

If the first or the second monitoring system detects a relevant fault, this is transmitted via the CAN-bus to the central control unit, which then takes appropriate measures. In particular, it initiates an emergency driving operation or switches off the peripheral control unit, thereby deactivating the output stages.

On the basis of request signals A1 and A8 and crankshaft signal KW, control calculator 230 calculates the required current profile and/or voltage profile so as to control the load circuits in an appropriate manner. This signal reaches output stage 240. A conventional output device may be used as the output stage, in particular, an output stage having at least one high-side switch and at least one low-side switch may be utilized. A common high-side switch may be used for all load circuits or a group of load circuits. By appropriate control of the high-side switch and the low-side switch, a suitable current/voltage profile is then obtained at the load circuit.

One operating cycle, i.e., one engine rotation, is made up of two crankshaft rotations. This means that the peripheral control unit is unable to directly detect in which of the two crankshaft rotations occurring. Therefore, the peripheral control unit does not clearly recognize, for instance, whether the angular range between t1 and t3 or the angular range between t5 and t7 is occurring. A synchronization is required for this.

A synchronization procedure according to the present invention is as follows. In a first step, it is checked whether a permissible request signal is present, all checks may be implemented in the process. If it is detected that the request signal is in the permissible angular range, synchronization has taken place. If it is detected that the request signal is outside of the permissible angular range, it is checked whether the request signal in the angular range phase-shifted by 360 degrees is plausible. If this is the case, a new synchronization is implemented. If the request signal in this angular range is not permissible either, a fault is detected.

Normally, it is provided that the output stage also monitors for faults. For instance, it may be provided that the currents flowing through the load circuit, and/or the dropping voltage values at the load circuit or at components of the output stage are monitored. The voltage may be monitored using a so-called booster capacitor. This booster capacitor supplies the increased voltage required in the switching-on process, which generally is higher than the supply voltage. If the output stage detects a corresponding fault, this is also reported to the second monitoring system and forwarded from there to the central control unit via the CAN-bus.

Figure 4:
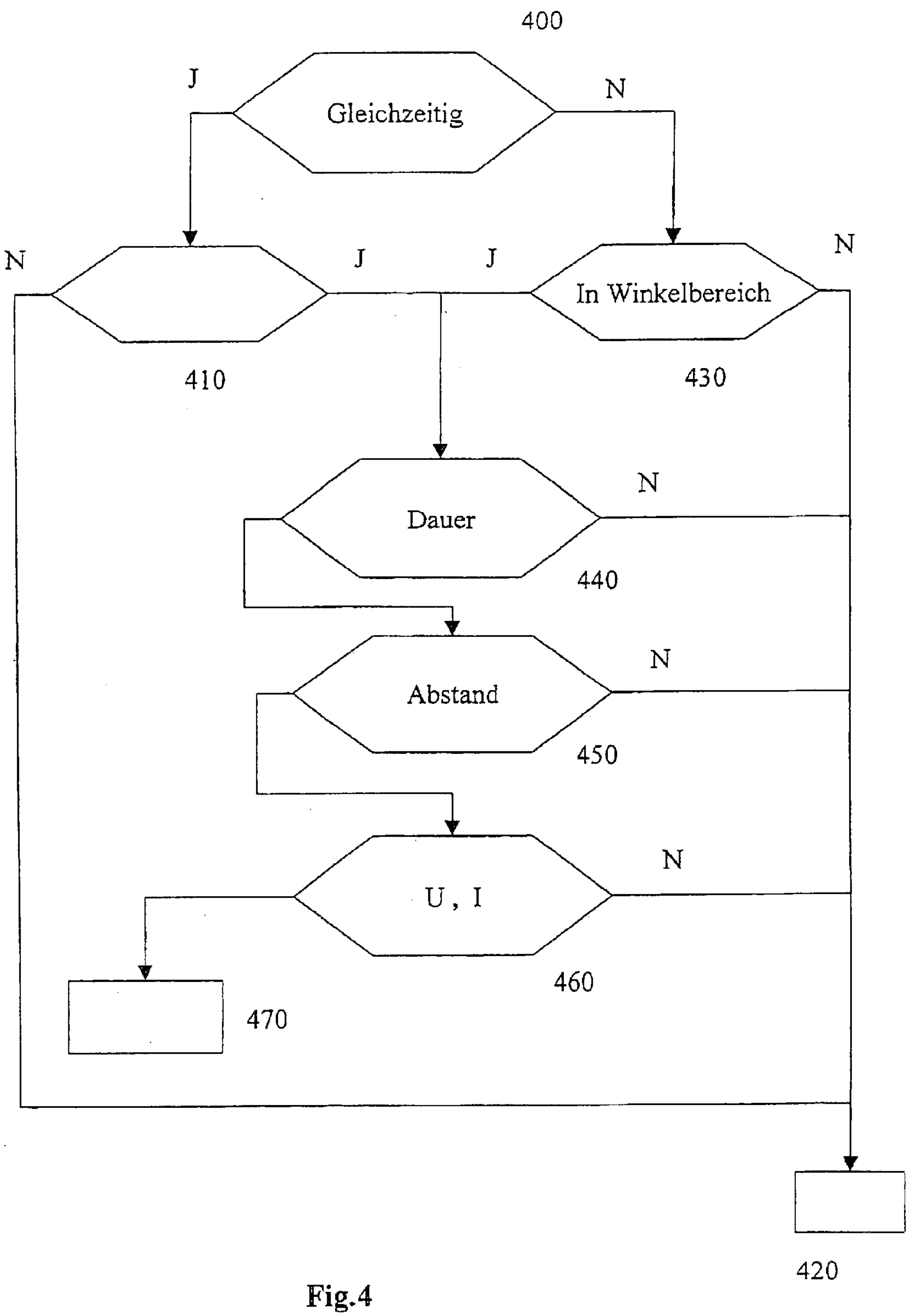
FIG. 4 is a flow chart of an embodiment of the procedure for controlling an internal combustion engine according to the present invention.

This procedure for monitoring and checking the plausibility of the signals is represented in FIG. 4 with the aid of a flow chart. A first query 400 checks whether two request signals A1 through A8 occur simultaneously. It is checked, in particular, whether the beginning and/or the end of two request signals occur(s) simultaneously or nearly simultaneously.

If this is the case, i.e., two request signals are present at the same time, a query 410 checks whether a special operating state is present. In these special operating states, it may happen that fuel is metered in two cylinders simultaneously. This is the case, for instance, in internal combustion engines having eight cylinders, when a post-injection takes place for exhaust-gas aftertreatment. In such a special operating state two simultaneously occurring request signals do not constitute a fault if the two request signals each occur within their permissible angular ranges or in their permissible time interval.

If such a special operating state does not exist, the program concludes with step 420. In step 420, a fault is detected and a corresponding signal transmitted via the CAN-bus. If two request signals A1 through A8 occur simultaneously, a short circuit between two lines between the central control unit and the peripheral control unit must be assumed.

In internal combustion engines in which such simultaneous injections cannot occur, step 410 may be omitted. In this case it is immediately switched to step 420 and a fault detected when query 400 detects simultaneous injections.

If query 400 detects that none of signals A1 through A8 occur at the same time, a query 430 checks whether the request signals occur in a permissible angular range, that is, it is checked whether the request signals of a specific cylinder are in the appropriate angular range. For instance, the request signal for the first cylinder must occur between instant t1 and t3.

If one of these conditions is not satisfied, i.e., the request signal occurs outside of a specific angular range of the crankshaft or the camshaft and/or outside of a particular time interval, the program ends in step 420. If all conditions are satisfied, query 440 follows.

Query 440 checks whether the duration of the request signal is too long or too short. If this is the case, i.e., the request signal is too long or too short, the program ends with step 420. If the request signal satisfies the required condition, step 450 follows. This query checks whether the duration of the injection is plausible. Normally, the request signal is significantly shorter than a segment.

In query 450, it is checked whether the interval between two request signals satisfies certain criteria. In particular, the interval between two request signals must be greater than a threshold value; if this is not the case, the program also ends with step 420. If this is the case, i.e. the intervals between the request signals are plausible, step 460 follows. The interval between two partial injections may be checked for plausibility, that is, it may be checked whether the interval between instants t12 and t13 assumes a permissible value.

It is particularly advantageous if the number of partial injections is counted. For monitoring, this determined number of partial injections is compared to the number of partial injections transmitted by the central control unit. To this end, it is required that the central control unit or the peripheral control unit transmit the corresponding number via the CAN-bus.

In step 460 it is checked whether the current values and/or voltage values measured and/or acquired by the output stage assume plausible values. If this is not the case, the program also ends with step 420. If this is the case, a faultfree operation is detected in step 470. As an alternative, it may also be provided that output stage 240 implements a fault monitoring and transmits a signal to the monitoring system in case of a specific fault. In this embodiment, query 460 merely checks whether a corresponding fault signal is present from output stage 240.

In FIG. 4, the various checks occur in succession over time. However, a different check sequence may be selected as well. It is particularly advantageous if the queries are processed in parallel.

In a particular embodiment, the check for the permissible angular range, i.e., query 430, occurs as the last query. If query 430 detects that the request signal is not within the permissible angular range, it is checked whether the request signal in the angular range, phase-shifted by 360 degrees, is plausible. If this is the case, a new synchronization is implemented. If the request signal in this angular range is impermissible as well, a fault is detected.

What is claimed is:

1. A method for controlling an internal combustion engine having a central control unit and a peripheral control unit, the method comprising:

- transmitting request signals from the control unit;
- determining a beginning and an end of a metering of a fuel;
- receiving a control signal at at least two load circuits from the peripheral control unit;
- causing the peripheral control unit to check at least one of the request signals and an additional signal for plausibility; and detecting a fault if at least one of a beginning and an end of two of the request signals occurs one of simultaneously and nearly simultaneously.

2. The method according to claim 1, further comprising:

determining no fault is present if a special operating state is present.

3. The method according to claim 1, further comprising:

detecting the fault if one of the request signals occurs outside of at least one of:

a) a specific angular range of one of a crankshaft and a camshaft; and b) a specific time interval.

4. The method according to claim 1, wherein no fault is detected when a first request signal and a second request signal occur within one of a permissible angular range and a permissible time interval.

5. The method according to claim 1, further comprising:

detecting the fault if one of the request signals is at least one of:

a) shorter than a first threshold value; and b) longer than a second threshold value.

6. The method according to claim 1, further comprising:

detecting the fault if an interval between a first request signal and a second request signal is smaller than a threshold value.

7. The method according to claim 1, further comprising:

detecting the fault if a current value and a voltage value in a region of an output stage assume implausible values.

8. A device for controlling an internal combustion engine, comprising:

a peripheral control unit;

a central control unit, the central control unit transmitting request signals to the peripheral control unit;

an arrangement for determining a beginning and an end of a metering of a fuel;

at least two load circuits, the at least two load circuits receiving a control signal from the peripheral control unit; and an arrangement for detecting a fault if at least one of a beginning and an end of two of the request signals occurs one of simultaneously and nearly simultaneously, wherein the peripheral control unit checks the request signals and an additional signal for plausibility.

* * * * *